(12) United States Patent
Baughman et al.

(10) Patent No.: US 12,354,309 B2
(45) Date of Patent: Jul. 8, 2025

(54) IDENTIFICATION OF EFFECT PIGMENTS IN A TARGET COATING

(71) Applicant: BASF COATINGS GMBH, Münster (DE)

(72) Inventors: Donald R. Baughman, Whitehouse, OH (US); Guido Bischoff, Münster (DE); Matthew Leopold, Whitehouse, OH (US); Jessica J. McGuckin, Whitehouse, OH (US); Stuart K. Scott, Southfield, MI (US)

(73) Assignee: BASF COATINGS GMBH, Muenster (DE)

( * ) Notice: Subject to any disclaimer, the term of this patent is extended or adjusted under 35 U.S.C. 154(b) by 437 days.

(21) Appl. No.: 17/999,713

(22) PCT Filed: May 20, 2021

(86) PCT No.: PCT/EP2021/063564
§ 371 (c)(1),
(2) Date: Nov. 23, 2022

(87) PCT Pub. No.: WO2021/239593
PCT Pub. Date: Dec. 2, 2021

(65) Prior Publication Data
US 2023/0221182 A1    Jul. 13, 2023

(30) Foreign Application Priority Data
May 27, 2020   (EP) .................................... 20176958

(51) Int. Cl.
*G06T 7/90*   (2017.01)
*G01J 3/46*   (2006.01)
(Continued)

(52) U.S. Cl.
CPC ................ *G06T 7/90* (2017.01); *G01J 3/463* (2013.01); *G06T 7/10* (2017.01); *G06V 10/443* (2022.01);
(Continued)

(58) Field of Classification Search
None
See application file for complete search history.

(56) References Cited

U.S. PATENT DOCUMENTS

2007/0172113 A1*   7/2007   Sai ........................ G01N 21/25
                                                               382/162
2016/0117844 A1*   4/2016   Beymore ................ G01J 3/463
                                                               382/162
(Continued)

FOREIGN PATENT DOCUMENTS

EP           3839480 A1 *   6/2021   ............. G01N 21/57

OTHER PUBLICATIONS

Spehl et al. "Application of Backpropagation nets for color recipe prediction as a nonlinear approximation problem," Proceedings of the International Conference on Neural Networks (ICNN), New York, IEEE, US, vol. 5, Jun. 27, 1994, pp. 3336-3341, XP000532724, IKSBN: 978-0-7803-1902-8.

(Continued)

*Primary Examiner* — Miya J Cato
(74) *Attorney, Agent, or Firm* — Armstrong Teasdale LLP

(57) ABSTRACT

Described herein is a computer-implemented method. The method includes: providing digital images and respective formulas for coating compositions with known pigments and/or pigment classes associated with the respective digital images, classifying, using an image annotation tool, for each digital image, each pixel, by visually reviewing the respective digital image pixel-wise, providing, for each digital image, an associated pixel-wise annotated image, training a
(Continued)

first neural network with the provided digital images as input and the associated pixel-wise annotated images as output, making the trained first neural network available for applying the trained first neural network to at least one unknown input image of a target coating and for assigning a pigment label and/or a pigment class label to each pixel in the at least one unknown input image, and determining and/or outputting, for each unknown input image, a statistic of corresponding identified pigments and/or pigment classes, respectively.

17 Claims, 6 Drawing Sheets

(51) Int. Cl.
*G06T 7/10* (2017.01)
*G06V 10/44* (2022.01)
*G06V 10/56* (2022.01)
*G06V 10/764* (2022.01)
*G06V 10/82* (2022.01)

(52) U.S. Cl.
CPC ............ *G06V 10/56* (2022.01); *G06V 10/764* (2022.01); *G06V 10/82* (2022.01); *G06T 2207/20081* (2013.01); *G06T 2207/20084* (2013.01)

(56) References Cited

U.S. PATENT DOCUMENTS

| | | | |
|---|---|---|---|
| 2019/0331591 A1* | 10/2019 | Norris | G01N 27/60 |
| 2019/0332254 A1* | 10/2019 | Norris | G01J 3/463 |
| 2021/0310870 A1* | 10/2021 | Kettler | G06T 7/90 |
| 2022/0237832 A1* | 7/2022 | Williams | G06V 10/44 |

OTHER PUBLICATIONS

Rohani et al. "Pixment unmixing of hyperspectral images of paintings using deep neural networks", ICASSP 2019—2019 IEEE International Conference on Acoustics, Speech and Signal Processing, IEEE, May 12, 2019, pp. 3217-3221, XP033565371, DOI: 10.1109/ICASSP.2019.8682838.

International Search Report and Written Opinion for corresponding PCT/EP2021/063564 mailed Aug. 5, 2021; 11 pages.

\* cited by examiner

IDENTIFICATION OF EFFECT PIGMENTS IN A TARGET COATING

CROSS-REFERENCE TO RELATED APPLICATIONS

This application is a U.S. National Phase Application of PCT/EP2021/063564, filed May 20, 2021, which claims the benefit of priority to European Patent Application No. 20176958.5, filed May 27, 2020, the entire contents of which are hereby incorporated by reference herein.

FIELD OF THE INVENTION

The present invention refers to a computer-implemented method and a device for identification of effect pigments in a target coating using semantic segmentation of digital images.

BACKGROUND OF THE INVENTION

Identification of effect pigments and levels present in a target coating, such as an automotive coating is the major color matching challenge for selecting the optimal formula from a formulation and measurement database and adjusting that formula to an optimal color match.

Today, for the color search and retrieval process additional features like e. g. coarseness, sparkle area, sparkle intensity, sparkle grade and/or sparkle color variation/distribution are used as side condition, beside color information, to find an optimal solution for a given target color/target coating. These additional features are metrices for different visual properties of the texture appearance of a color.

Prior art used a spectrophotometer with black and white image capability to calculate texture values Gdiff (diffuse graininess or coarseness), Si (sparkle intensity), and Sa (sparkle area), as introduced by the company Byk-Gardner. This was a good first step towards characterizing the texture of a coating but had limited abilities to identify the specific effect pigment in a formulation.

These additional features are typically derived from image raw data of the target coating captured by today's photospectrometer instruments like e. g. Xrite MA-T6®, MA-T12® or Byk mac i®. The image raw data are processed by image processing algorithms. As output of those algorithms texture features, i. e. texture values are gained which are supposed to represent optical properties of the texture of the target coating. Those texture values are classified according to known industry standards.

Due to the nature of complex coating mixtures, it is sometimes difficult to formulate, identify, and/or search for acceptable matching formulations and/or pigmentations. Ideally, a human being could view a complex coating mixture and determine the appropriate pigments within the coating mixture. However, in reality the pigments in a coating mixture may not be readily available in a set of toners of a paint system that is to be utilized to make a matching coating. Thus, a person skilled in color matching has to make a determination as to whether the paint system contains appropriate offsets and, if so, must determine additional changes which need to be made to accommodate the offsets given that they are not identical matches to the original pigmentation.

It would be desirable to have a method and a device that can measure an unknown target coating and can search, based on the measured data of the target coating, a database for the best matching coating formula within the database and/or that can create, based on the measured data of the target coating, a new coating formula. However, as to now, known systems are only able to determine a color or bulk effect pigment type, but generally cannot assist in determination of, for example, a specific pearl necessary for matching the unknown target coating.

Known techniques using cameras and/or spectrometers, optionally combined with microscopic evaluation of a target coating, are generally not appropriately defined to efficiently address new effect pigmentations or complex mixtures and are largely focused on an individual evaluation of the target coating, i. e. on an analysis from case to case which is a very time consuming process as each new unknown target coating requires to pass through all analysis steps. Thus, such time consuming process may not satisfactorily address application issues which require a time efficient analysis of the target coating combined with a provision of a matching formula.

There are further strategies using painted or virtual samples representing various textures, and then comparing those to the unknown target coating. However, such techniques often require substantial user intervention and, thus, are subjective, which may produce inconsistent results.

The technique described in U.S. Pat. No. 9,905,027 B2 improved the technology by adding hue analysis to determine sparkle color distribution. This advancement improves the color matching capability but only utilizes a limited feature set from a color image. European patent application with the application number 19209119 entitled "Method and device for identification of effect pigments in a target coating" uses image segmentation to identify sparkle points and convolutional neural networks for identification of pigments and/or pigment classes. This enables the extraction of the hidden features in effect coating images, but still has some misclassifications due to adjoining sparkle points, sparkle points deeper in film, chromatic aberrations, coating defects, etc. Aside from that point an effective generation of training data was only intended based on measurements of colors including only one type of effect pigment. That's why the neural network could not learn interactions between different types of effect pigments in one color, e. g. between aluminum pigments with overlapping white pearl pigments.

Thus, a need exists for a method and a device that are suitable for efficiently analyzing unknown target coatings comprising effect pigments in consideration of interactions between different types of effect pigments.

SUMMARY OF THE INVENTION

The above-mentioned objects are solved by the method and the device with the features of the respective independent claims. Further embodiments are presented by the following description and the respective dependent claims.

The present disclosure refers to a method, particularly a computer-implemented method, the method comprising at least the following steps:
  providing digital images and respective formulas for coating compositions with known pigments and/or pigment classes associated with the respective digital images,
  configuring an image annotation tool for classifying, for each image, each pixel, by visually reviewing the respective image pixel-wise, using at least one (localized) segmentation technique and annotating each pixel with a pigment label and/or a pigment class label, i.e. attributing each pixel to a pigment and/or pigment class and/or the background, in alignment with the visual appearance and the formula associated with the respective image, providing, for each image, an associated pixel-wise annotated image, training a first neural network, implemented and running on at least one computer processor, with the digital images as input, i.e. input images, and the associated pixel-wise annotated images as output, i.e. output images, wherein the first neural network is trained to classify/correlate every pixel in a respective input image with a pigment label and/or pigment class label of a respective associated annotated image, making the trained first neural network available in the at least one computer processor for applying the trained first neural network, i.e. the trained correlation between input image and output pigments and/or pigment classes, to at least one unknown input image of a target coating and for assigning a pigment label and/or a pigment class label to each pixel in the at least one unknown input image, wherein the pigment labels and/or the pigment class labels include both pigment or pigment class specific labels and background specific labels, determining and/or outputting, for each input image, based on the assigned pigment labels and/or pigment class labels a statistic of corresponding identified pigments and/or pigment classes, respectively.

The image annotation tool is designed to provide a label repertory of pigment labels and/or pigment class labels and to display each digital image (in its original appearance) together with its associated formula such that a user is enabled to annotate each pixel of a respective image with a label, i.e. with a pigment label and/or a pigment class label of the label repertory in alignment with the visual appearance as well as with the displayed formula associated with the respective image. The image annotation tool displays both, the original digital image and the associated annotated image. The image annotation tool may display the original digital image with an exposure adjustment bar. Further, the image annotation tool displays the repertory of available labels, i.e. of available pigment labels and/or pigment class labels, which can be used to annotate the respective pixels of a respective image. Each label which can be set in a respective image as annotation, is assigned either to a specific pigment and/or pigment class including the background of the respective image. Thus, each label indicates an unambiguous assignment of a respective pixel which is annotated by the respective label.

It is possible that the step of providing digital images and respective formulas for coating compositions with known pigments and/or pigment classes associated with the respective digital images is realized by providing a database which comprises formulas for coating compositions with known pigments and/or pigment classes, and digital images associated with the respective formulas.

Generally, the proposed method comprises three main steps/phases. First, training data are prepared in terms of digital images of known formulas as input, i.e. as input images, and associated pixel-wise annotated digital images as output, i.e. as output images. Second, the first neural network is trained with the prepared training data and, finally, the trained first neural network is applied to image data of a target coating with an unknown formula in order to retrieve information about a pigmentation, particularly about an effect pigmentation of the target coating.

The terms "formula" and "formulation" are used synonymously herein. The terms "image" and "digital image" are used synonymously herein. The terms "segmentation technique" and "image segmentation technique" are used synonymously herein. The wording "in operative conjunction" means that the respective components, i. e. the computer processor and the at least one image segmentation technique and the computer processor and the at least one image annotation tool, are in communication with each other in such a way that the computer processor can control/operate the at least one image segmentation technique and/or the at least one image annotation tool and/or that the at least one image segmentation technique and/or the at least one image annotation tool can transmit respective results to the computer processor, respectively. The terms "associated with" and "interrelated with" are used synonymously. Both terms indicate a togetherness of the components which are associated/interrelated with each other.

According to an embodiment of the proposed method, the method further comprises the following steps:

using the statistic of the identified pigments and/or pigment classes as additional information within a database search for the target coating by comparing it with respective statistics determined for one or more preliminary matching formulas, determining at least one of the one or more preliminary matching formulas as the formula(s) best matching with the target coating.

The one or more preliminary matching formulas can be determined using further matching criteria, such as color and/or texture values of the one or more preliminary matching formulas with regard to the color and/or texture values of the target coating, particularly in conjunction with a color match metric (such as dE*) and/or a texture match metric (such as dS, dG, etc.) and/or a match metric defining a similarity between reflectance curves of the target coating and the one or more preliminary matching formulas (such as the similarity index SI). Further, any combination of the aforementioned match metrices can be used. Thus, the statistic is used as additional information within color search algorithms for a target color, i.e. the target coating, in a formulation database.

According to a further aspect of the proposed method, the method further comprises the step of:

using the statistic of the identified pigments and/or pigment classes as additional information within a match from scratch.

The statistic can be used as additional information, e.g. effect pigment pre-selection or constraints, within color matching algorithms.

The annotations of the training images, i.e. of the provided digital images may be done/proved/corrected by a human user. The human user sees on a display of the image annotation tool the digital images with the annotations and the corresponding formulation with an effect pigment contribution in the respective paint associated with the respective digital images. The human user has to take care that the annotations in the provided training images align with the visual appearance of the image as well as with the displayed formulation of the paint (which is also displayed to the user): e. g. if a red color contains red sparkles then it helps the user to see the formulation in order to differentiate aluminum flakes or other red effect pigments.

According to still a further aspect of the proposed method, the steps of providing the digital images and of pixel-wise classifying the digital images comprise the steps:

providing a database which comprises formulas for coating compositions with known pigments and/or pigment classes, and digital images associated with the respective formulas, performing, using at least one computer processor in operative conjunction with at least one image segmentation technique, for each formula and for each digital image associated with that formula an image analysis to identify at least one sparkle point and its location within the respective image, classifying, using the at least one computer processor in operative conjunction with at least one image classification technique, for each image each identified sparkle point, correcting false classifications within each image in the image annotation tool by visually reviewing the respective image pixel-wise, using the at least one localized segmentation technique.

The at least one computer processor on which the first neural network is implemented may be the same or may be in operative conjunction with the at least one computer processor which is used for performing the aforementioned image analysis to identify the at least one sparkle point in the respective image.

Color values, where required, are obtained, using at least one measuring device, by analysing spectral curves of the target coating, the spectral curves being measured at different measurement geometries with respect to a surface of the target coating. Generally, a spectral measurement geometry is defined by an illumination direction/angle and an observation direction/angle. Typical spectral measurement geometries are a fixed illumination angle at 45° measured relative to the surface normal of the coating and viewing angles of −15°, 15°, 25°, 45°, 75°, 110°, each measured relative to the specular angle, i. e. the specular direction, the specular direction being defined as the outgoing direction that makes the same angle with the normal of the coating surface as the incoming direction of the respective light ray.

The digital images, i.e. corresponding image values, and optionally texture values are obtained by capturing, using an image capturing device, multiple digital images, particularly HDR images, each obtained at a different measurement geometry with respect to a surface of a respective coating, i.e. of a coating associated with a formula of the database (in the training phase) or of a coating of a target coating (as unknown input image). Typical image-based texture measurement geometries are a fixed position for the image capturing device, i. e. a camera, at 15° to the nominal of the surface of the respective coating. The illumination angles are chosen as r15as−15, r15as15, r15as−45, r15as45, r15as80 and semi-diffuse as defined from X-Rite MA-T6®. "Semi-diffuse" means here "as diffuse as possible" with respect to the measuring device and its spatial dimensions. Regarding the geometric designations the positions of the at least one measuring device, e. g. the camera, and of the illumination are reversed. That means that the specular angle is here defined by the fixed position of the camera. Specifically, this means: the designation "r15 as −15", for example, denotes "reverse" with "r", with "15" the fixed position of the camera, namely at an angle of 15° to the nominal of the surface of the target coating, with "as" "aspecular" and with "−15" the illumination angle measured relative to the specular angle.

The texture values/parameters are particularly sparkle grade SG, sparkle color variation CV and coarseness C (or diffuse coarseness Cdiff) or graininess G (or diffuse graininess Gdiff), sparkle intensity Si and sparkle area Sa of the respective coating.

The at least one measuring device may be chosen as a photospectrometer like e. g. Xrite MA-T6®, Xrite MA-T12® or Byk mac i®. Such photospectrometer may also be combined with further suitable devices such as a microscope in order to gain still more image data, like e. g. microscope images.

The aforementioned database is a formulation database which comprises formulas for coatings compositions and interrelated colorimetric data. The interrelated colorimetric data comprise, for each formula, digital images of a sample coating based on the respective formula and, optionally also spectral data, i. e. color values and texture values. In the scope of the present disclosure, a sample coating is to be understood as a coating which is based on a known formulation of the database. For each known formulation, the ingredients, such as the pigments, i.e. the pigment types and/or pigment classes, and the respective amounts of such ingredients, i.e. of such pigments are known.

The wording "to be in communication with" indicates that there is a communicative connection between the respective components. Every suitable communication technology can be used for such a communicative connection.

The statistics, i.e. the statistical distribution, e.g. a function over the respective frequency and/or percentage of the pigments and/or pigment classes associated with the respective pigment labels and/or pigment class labels, determined and/or outputted for the respective digital images can each be presented as a respective histogram and/or as a respective vector. The respective function may be of simple linear type like adding up each single count of the respective pigment and/or pigment class rated against the total sum of all pigments and/or pigment classes, but it also may be of complex type like summing up each pigment and/or pigment class together with rated contributions of nearest-neighbour pigments and/or pigment classes. Moreover, the respective function behaviour may include linear, quadratic, cubic or even higher power. The respective function may comprise rated differences of the single count against the mean of counts of all pigments and/or pigment classes, where the respective difference may be formed as an absoluted value or with a certain power, and where the factor of rating may be formed by an uncertainty of the measurement method of identifying the respective pigment and/or pigment class and a certain power of this uncertainty. The respective statistical distribution of the pigment labels and/or pigment class labels allows conclusions to be drawn about the percentage of the respective pigments and/or pigment classes in an unknown formulation of the target coating associated with a respective unknown digital image and/or in a known formulation of a coating composition retrieved from the database and associated with a respective digital image.

In the case of n different pigment labels (and/or pigment class labels) in a digital image which has been captured of the target coating or which is associated with a known formulation of a coating composition and retrieved, for example, from the database, it may result that a number S1 of pigment labels (and/or pigment class labels) is correlated with pigment (and/or pigment class) 1, a number S2 of pigment labels (and/or pigment class labels) is correlated with pigment (and/or pigment class) 2, and so on, until a number Sk of pigment labels (and/or pigment class labels) is correlated with pigment (and/or pigment class) k, with k being greater than 2 and smaller or equal than n, with k, n, both being integer numbers.

For example, the numbers S1, S2, . . . , Sk together with the respective pigments (and/or pigment classes) 1, 2, . . . , k allow to compile a linear statistic of frequency about the respective fraction of the different pigments (and/or pigment classes) 1, 2, . . . , k within the target coating, i. e. within the formula associated with the target coating and/or within the known formulation associated with the respective digital image. In a more simple case only one or two pigments and/or pigment classes are included in the target coating, i. e. within the formula associated with the target coating and/or within the known formulation associated with the respective digital image. A statistic based on this more easy case is accordingly simplified.

According to one embodiment of the proposed method, the at least one image segmentation technique is chosen from the group comprising at least: manual segmentation techniques, neural-network based methods, threshold methods, edge-based methods, clustering methods, histogram-based methods, hybrid methods, and combinations thereof.

In the preparation stage/phase of the training data, before performing the pixel-wise classification of the digital images, the digital images may be pre-treated.

At least one image segmentation and classification technique may be applied to each digital image in order to identify at least one sparkle point and its location within the respective image and to classify each identified sparkle point, using a second neural network.

For classifying each identified sparkle point, using the second neural network, the method further comprises the following features:
  creating sub-images of each identified sparkle point from the respective images,
  providing the sub-images as respective input to the second neural network, the second neural network being trained to correlate a respective sub-image of a respective sparkle point with a pigment and/or pigment class,
  obtaining from the second neural network, for each identified sparkle point associated with a respective sub-image a correlated pigment and/or pigment class as a respective output,
  classifying for each image each identified sparkle point based on the respective output of the second neural network.

That means that the second neural network is used to pre-treat each digital image as an image of all identified pigment classes (from subimages) mapped on the associated pixel locations of the full image (with black background). This is used to generate full images of pixel-wise pigment classes. However, the classifications in such pre-treated images must often be corrected by visually reviewing the respective images pixel-wise, using the image annotation tool.

Such pre-treatment of the digital images is further described in detail in the European patent application number 19209119.

The proposed method can be performed in addition, particularly previously or subsequently to further pigment identification methods using a sparkle color distribution and/or a sparkle size distribution. Such methods are described, for example, in US 2017/0200288 A1, the European patent application with application number 19154898, the European patent application with the application number 19190388 and/or the aforementioned European patent application 19209119.

According to still another aspect of the proposed method, the classifying step is performed and/or supplemented by visual inspection and manual entering of respective annotations about correctly assigned pigments and/or pigment classes in the image annotation tool, i.e. by pixel-wise inspecting and annotating each pixel with a respective pigment label and/or pigment class label. Here, the user gets displayed the information about the formula, i.e. the effect pigment composition to the corresponding (associated) digital image so that he can take care the annotations in alignment with the visual perception and with the effect pigment composition. That means that within the visual reviewing process it is important that the user gets displayed the correct formula of the corresponding color (as shown in the respective image) so that the user is enabled to make correct annotations in the respective image, i.e. the image annotations should align with the visual appearance as well as with the displayed formula of the corresponding color.

Every pixel in a respective digital image is labeled with either '0', meaning that the pixel is part of the background and not part of a sparkle point, or a pigment specific label elected from the label repertory meaning that the pixel is assigned to the respective pigment and/or pigment class. The identified labels are overlaid on the original HDR (High Dynamic Range) image. Thus, annotated digital images are created.

A correlation of each pixel of a respective digital image with at least one pigment and/or pigment class is derived on the basis of visual inspection in alignment with the known formulation associated with the respective image. Due to the knowledge of the formulation associated with the respective image, it is known which pigment and/or pigment class with which concentration is included in the respective formulation. On the basis of this knowledge together with the visual inspection, each pixel can be assigned with a sufficiently high probability to a specific pigment and/or pigment class, i.e. can be annotated with a respective pigment label and/or pigment class label.

Alternative or additional segmentation techniques include threshold methods, edge-based methods, clustering methods, histogram-based methods, neural network-based methods, hybrid methods, etc.

The first neural network which is to be trained and made available as trained first neural network is chosen as a pixel-wise segmentation convolutional neural network, particularly based on and/or realised as at least one of the following neural networks: U-net, SegNet.

The task of the first neural network is to classify and localize all sparkle points in a respective image. The goal of semantic image segmentation is to label each pixel of an image with a corresponding pigment and/or pigment class, i.e. to annotate each pixel of the image with a corresponding pigment label and/or pigment class label. The output in semantic segmentation may not just be labels for the pixies but optionally a high resolution image (typically of the same size as the input image) in which each pixel is classified to a particular pigment and/or pigment class, i.e. each pixel is labeled with a particular pigment label and/or pigment class label. Thus, it is a pixel level image classification. Along with such pixel level image classification, the computer processor is configured to classify each sparkle point separately. That means that all sparkle points are classified separately (in a different color). Also all pixels which do not belong to a sparkle point are classified as "background".

U-net was developed by Olaf Ronneberger et al. for Bio Medical Image Segmentation. The architecture contains two paths. The first path is a contraction path (also called encoder) which is used to capture the context in a respective image. The encoder is just a traditional stack of convolutional and max pooling layers. The second path is the symmetric expanding path (also called decoder) which is used to enable precise localization using transposed convolutions. Thus it is an end-to-end fully convolutional network (FCN), i.e. it only contains convolutional layers and does not contain any dense layer because of which it can accept images of any size.

SegNet is a deep encoder-decoder architecture for multi-class pixelwise segmentation researched and developed by members of the Computer Vision and Robotics Group at the University of Cambridge, UK.

Finally, on the basis of the determined statistic(s) of the identified pigments and/or pigment classes for the at least one unknown image of the target coating, a best matching formula(s) is (are) identified and forwarded to a mixing unit which is configured to produce/mix a paint/coating composition based on the identified best matching formula. The mixing unit produces such paint/coating composition which can then be used in place of the target coating. The mixing unit may be a component of the proposed device.

It is possible to compute statistics about the annotations, i.e. about the pigment labels and/or pigment class labels and, hence, about the respective pigments and/or pigment classes. The statistic can be shown/displayed as histogram and/or as a respective vector on a suitable display coupled with the at least one computer processor. Such a histogram may correspond to a histogram of pigment class counts/percentages for all pigment classes. Further such a statistic may indicate count/percentage of pigment and/or pigment class within a respective image. Further, such a statistic may specify a difference in pigments between a target coating and one or more preliminary matching formulas of a database.

Further, the retrieved statistic about effect pigment composition can be used for the color search and retrieval process. After a determination of one or more preliminary matching formulas which can be retrieved from a database based on color values and/or texture values obtained for a target coating, a statistic of the identified pigments and/or pigment classes may be determined and outputted for the target coating and for each preliminary matching formula, respectively. Further the statistic determined for the target coating may be compared with the statistics determined for the one or more preliminary matching formulas, and at least one of the one or more preliminary matching formulas may be determined as the formula(s) best matching with the target coating.

The color search (database) and retrieval process may be improved by additional information in terms of the aforementioned statistics. The color matching and adjustment process may also be improved by use of the right effect pigments derived from the gained statistics.

Generally, a precise correlation of a digital image with a pixel-wise annotated image requires a high quantity of training data. As the database generally comprises more than 30.000 formulas and associated image sets, a correspondingly high number of training data is obtained. Thus, a sufficiently high number of training data can be created, although the number of available pigments is countable, i. e. limited. The number of training data for the first neural network, i. e. the number of available digital images of known formulations can be further augmented by continue training the first neural network whenever an initially unknown input image can be assigned to correct pigments and/or pigment classes. That means that the training of the first neural network is also continued dynamically during operation.

Only in the event of any change in the number/multitude of available pigments or pigment classes, the first neural network and also the optionally used second neural network must be redefined, retrained, and retested.

A "previously known pigment/toner" means a pigment which is known and available as color component for color formulations.

The wording "formulas for coating compositions and associated images" means formulas for coating compositions and images which have been captured of the respective coatings.

The proposed method serves in particular for providing pixel-wise annotations of a digital image of a target coating and, thus, a statistic about different pigments and/or pigment classes being correlated with the respective image of the target coating, thus for concluding which pigments and/or pigment classes with which quantity are included by the formulation of the target coating. The first neural network used is based on semantic segmentation. The second neural network which may be used as image segmentation technique for providing training data for the first neural network is based on a learning process referred to as backpropagation.

The retrieved statistics about the annotations/labels, i.e. about the pigments and/or pigment classes correlated with the respective annotations/labels are used, e.g., for color search and/or retrieval processes.

"To identify a/the pigment" means to directly determine, based on the annotations/labels of a respective annotated image, the concrete pigment and/or to determine a pigment class to which the pigment belongs to. For instance, one pigment class could be constituted by metallic effect pigments and a further pigment class could be constituted by pearlescent effect pigments. Other suitable categorizations, particularly further refined categorizations are possible. It is e. g. possible to intersect the pigment class "metallic" into "coarse metallic" and "fine metallic" or into "small coarse/fine metallic" or "big coarse/fine metallic". It is possible to provide a pigment class "aluminium pigments" and a further class "interference pigments". The class "aluminium pigments" can be further subdivided into subclasses, such as a subclass "cornflakes" and a subclass "silverdollars". The class "interference pigments" can be further subdivided into the subclasses "white mica", "golden mica", "blue mica" and further into the subclasses "Xirallic®", "glass", "natural mica" etc. After comparison of the statistics some of the classes or subclasses can also be reunited appropriately.

The step of determining and/or outputting, for each input image, a statistic of corresponding identified pigments and/or pigment classes, respectively comprises providing a list of pigments with respective quantities and/or concentrations of the respective pigments.

In the case that a sparkle point in a respective digital image is correlated with a pigment class, a determination of a concrete pigment within said identified pigment class can be performed by use of any one of the above mentioned methods or a combination thereof using a sparkle color distribution and/or a sparkle size distribution within a respective image. Alternatively the choice of a concrete pigment can be done by human input/decision.

The present disclosure further refers to a device, i.e. a system. The device comprises at least one computer processor which is in communicative connection with at least one image segmentation technique, an image annotation tool, at least one neural network, and optionally with a database which comprises formulas for coating compositions with known pigments and/or pigment classes and digital images associated with the respective formulas, wherein the at least one computer processor is programmed to execute at least the following steps:
  a) receiving, e.g. retrieving from the database, digital images and respective formulas for coating compositions with known pigments and/or pigment classes associated with the respective images,
  b) configuring the image annotation tool for classifying, for each image, each pixel, by visually reviewing the respective image pixel-wise, using the at least one segmentation technique, and annotating each pixel with a pigment label and/or pigment class label in alignment with the visual appearance and the formula associated with the respective image,
  c) providing, for each image, an associated annotated image,
  d) training a first neural network with the digital images from the database as input, i.e. as input images, and the respective associated annotated images as output, i.e. output images, wherein the first neural network is trained to classify/correlate every pixel in a respective input image with a pigment label and/or pigment class label of associated respective annotated image,
  e) making the trained first neural network available for applying the trained first neural network, i.e. the trained correlation between input image and output pigments and/or pigment classes to an unknown input image and for assigning a pigment label and/or a pigment class label to each pixel in the unknown input image, wherein the pigment labels and/or the pigment class labels include both pigment or pigment class specific labels and background specific labels,
  f) determining and/or outputting, for each input image, based on the assigned pigment labels and/or pigment class labels, a statistic of corresponding identified pigments and/or pigment classes, respectively.

According to an embodiment of the proposed device, the at least one processor is further configured to perform, using the at least one image segmentation technique, for each formula and for each digital image associated with that formula an image analysis to identify at least one sparkle point and its location within the respective image, and to classify for each image each identified sparkle point, and to configure the image annotation tool for correcting false classifications within each image by visually reviewing by a user the respective image pixel-wise, using at least one localized segmentation technique.

According to a possible embodiment of the proposed device, the device further comprises the at least one image segmentation technique, the image annotation tool, and/or the first neural network.

According to a further aspect, the at least one image segmentation technique is one of the group comprising at least: neural-network based methods, threshold methods, edge-based methods, clustering methods, histogram-based methods, hybrid methods, and combinations thereof.

The image annotation tool is configured to display an original image with an exposure adjustment bar, an associated annotated image and labels, each label being associated with a pigment and/or a pigment class.

According to still a further aspect, the first neural network is a pixel-wise segmentation convolutional neural network, particularly the first neural network is based on at least one of the following neural networks: U-net, SegNet.

The proposed device further comprises an output unit which is configured to output and display, for each input image, a statistic of the identified pigments and/or pigment classes, respectively. The output unit may also be configured to output an annotated image associated with a respective input image. Such annotated image is pixel-wise annotated with the respective pixel labels and/or pigment class labels. The annotated image may be a high resolution annotated image.

The proposed device is particularly configured to execute a method as described herein.

The image annotation tool comprises an output unit, such as a display, and is configured to show a respective original image with exposure adjustment bar, an associated annotated image, labels, and an associated formula. The image annotation tool has automated localized segmentation and manual segmentation capabilities.

Generally, at least the database (also called formulation database) and the at least one processor are networked among each other via respective communicative connections. In the case that the at least one annotation tool, the image segmentation technique and the first neural network are separate components (i.e. not implemented on the at least one processor), whether internal components of the device or whether external components, the database and the at least one processor are also networked with those components via respective communicative connections, i.e. they are in communication with each other. Each of the communicative connections between the different components may be a direct connection or an indirect connection, respectively. Each communicative connection may be a wired or a wireless connection. Each suitable communication technology may be used. The formulation database, the at least one processor, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The processor may include or may be in communication with one or more input devices, such as a touch screen, an audio input, a movement input, a mouse, a keypad input and/or the like. Further the processor may include or may be in communication with one or more output devices, such as an audio output, a video output, screen/display output, and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the processor described herein and related components may be a portion of a local computer system or a remote computer or an online system or a combination thereof. The formulation database and software described herein may be stored in computer internal memory or in a non-transitory computer readable medium.

Within the scope of the present disclosure the database may be part of a data storage unit or may represent a data storage unit itself. The terms "database" and "data storage unit" are used synonymously.

The present disclosure further refers to a non-transitory computer readable medium with a computer program with program codes that are configured, when the computer program is loaded and executed by at least one computer processor which is in communicative connection with at least one image segmentation technique, an image annotation tool, at least one neural network and optionally with a database which comprises formulas for coating compositions with known pigments and/or pigment classes and digital images associated with the respective formulas, to execute at least the following steps:
- A) receiving, e.g. retrieving from the database, digital images and respective formulas for coating compositions with known pigments and/or pigment classes associated with the respective images,
- B) configuring the image annotation tool for classifying, for each image, each pixel, by visually reviewing the respective image pixel-wise, using the at least one image segmentation technique, and annotating each pixel with a pigment label and/or a pigment class label in alignment with the visual appearance and the formula associated with the respective image,
- C) providing, for each image, an associated annotated image,
- D) training a first neural network with the digital images from the database as input, i.e. as input images, and the associated annotated images as output, i.e. as output images, wherein the first neural network is trained to classify/correlate every pixel in a respective input image with a pigment label and/or pigment class label of a respective associated annotated image,
- E) making the trained first neural network available for applying the trained first neural network, i.e. the trained correlation between input image and output pigment and/or pigment classes, to an unknown input image of a target coating and for assigning a pigment label and/or a pigment class label to each pixel in the unknown input image, wherein the pigment labels and/or the pigment class labels include both pigment or pigment class specific labels and background specific labels, and
- F) determining and/or outputting, for each input image, based on the assigned pigment labels and/or pigment class labels, a statistic of corresponding identified pigments and/or pigment classes, respectively.

According to an embodiment of the proposed computer readable medium, the program codes are further configured to execute the following steps:
performing, using the at least one segmentation technique, for each formula and for each digital image associated with that formula, an image analysis to identify at least one sparkle point and its location within the respective image,
classifying, using at least one image classification technique, for each image each identified sparkle point,
providing/configuring the image annotation tool for correcting false classifications within each image by visually reviewing the respective image pixel-wise, using at least one localized image segmentation technique.

The invention is further defined in the following examples. It should be understood that these examples, by indicating preferred embodiments of the invention, are given by way of illustration only.

DETAILED DESCRIPTION OF THE DRAWINGS

Figure 1:
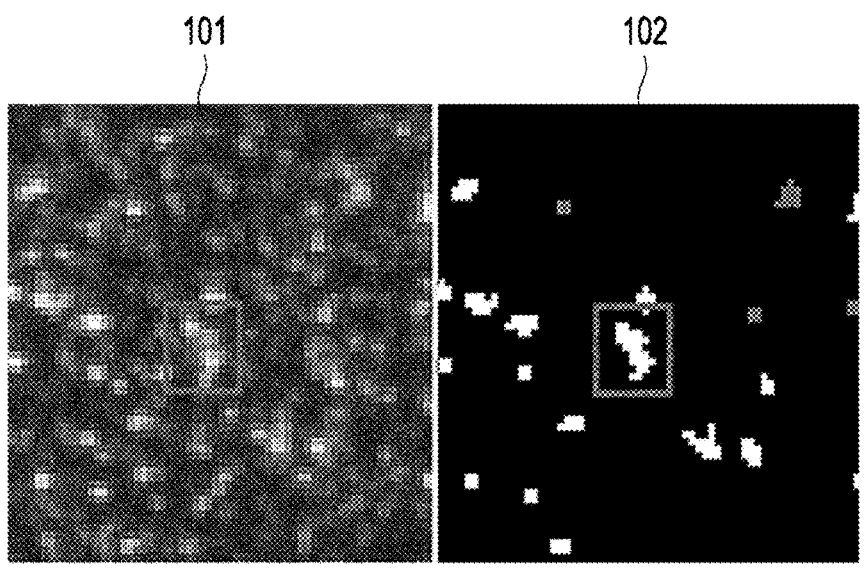
FIG. 1 illustrates examples of original images and respective images analysed according to the state of the art.
Figure 1:
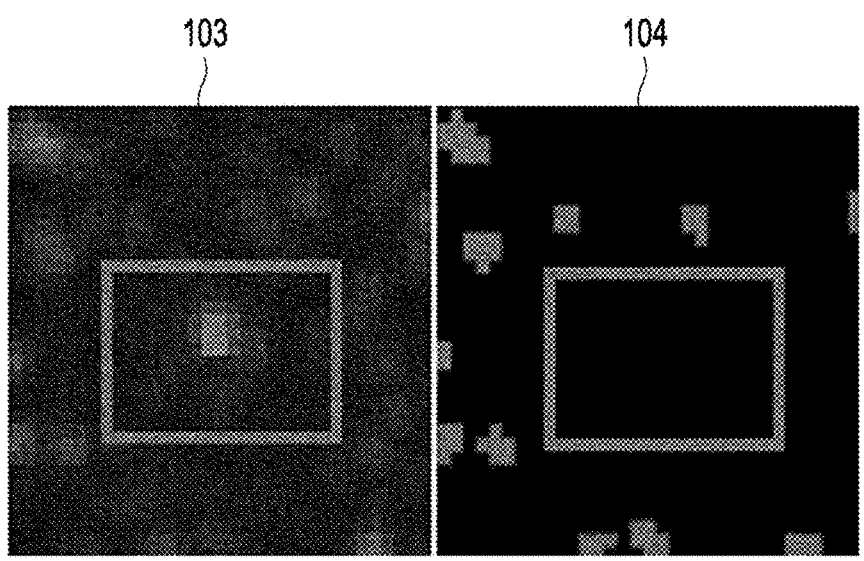
Figure 1:
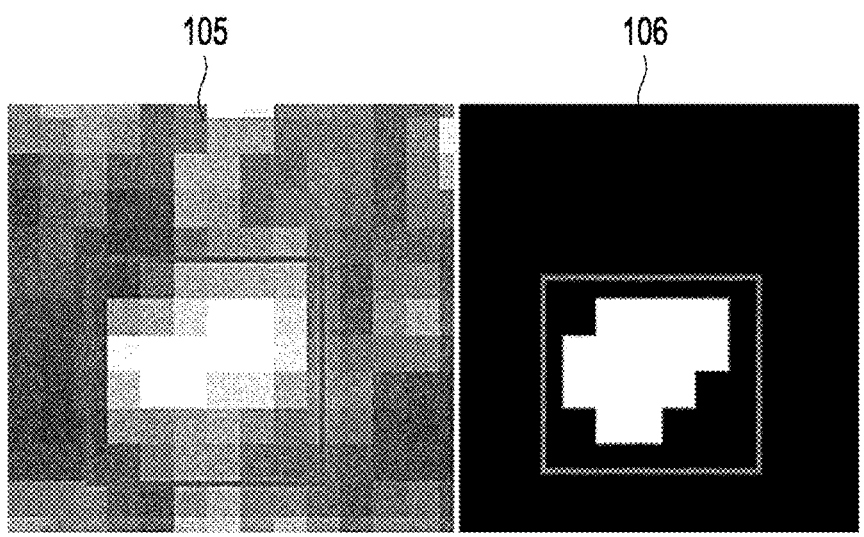

FIG. 1 illustrates examples of original images and respective images analysed according to the state of the art. FIG. 1a shows on the left side an original image 101 with adjoining sparkle points as indicated with the rectangular frame. After an image analysis according to the state of the art, such adjoining sparkle points cannot be distinguished from each other, i.e. boundaries between such sparkle points cannot be visualized. Therefore, such adjoining sparkle points merge into one another as illustrated in the respective rectangular frame in the image 102 on the right side of FIG. 1a.

FIG. 1b illustrates on the left side an original image 103 with sparkle points deeper in film. After an image analysis according to the state of the art, such sparkle points cannot be identified as illustrated in the respective rectangular frame in the image 104 on the right side of FIG. 1b.

FIG. 1c illustrates on the left side an original image 105 with coating defects, e.g. a scratch as indicated in the respective frame. After an image analysis according to the state of the art, such coating defects are identified but all other sparkle points in the surroundings of the scratch are missing as illustrated in the respective rectangular frame in the image 106 on the right side of FIG. 1c.

Figure 2:
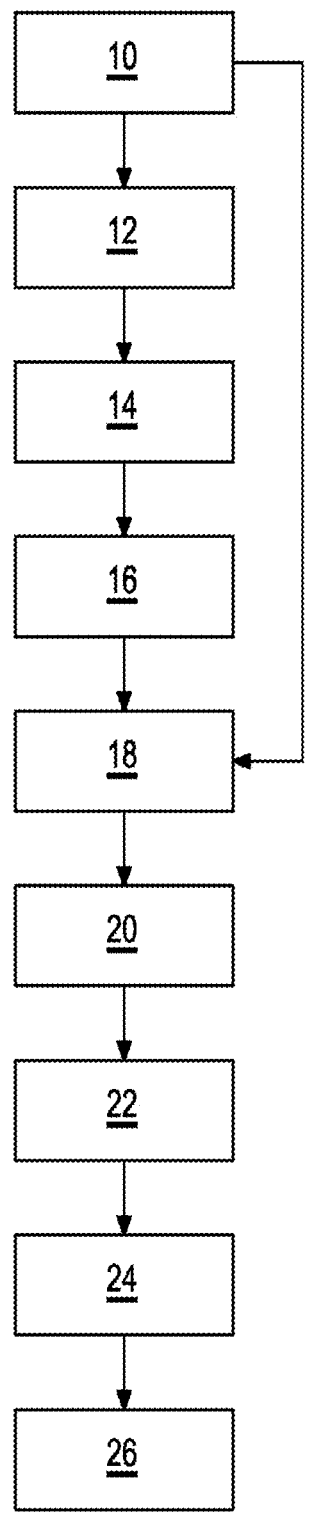
FIG. 2 schematically illustrates a flow diagram of an embodiment of the proposed method.

FIG. 2 schematically illustrates an embodiment of the proposed method. First, in step 10, digital images and respective known formulas associated with those images are provided. It is possible that those images and the associated formulas are retrieved from a database which comprises formulas for coating compositions with known pigments and/or pigment classes, and digital images associated with the respective formulas. Next, for each image of those digital images each pixel is classified, using an image annotation tool. In doing so, the respective image is visually reviewed pixel-wise and each pixel is annotated with a pigment label and/or a pigment class label in alignment with the visual appearance and the formula associated with the respective image.

According to one embodiment of the proposed method, each provided digital image is directly reviewed in step 18, by skipping steps 12, 14, 16 described below, by a human user using the image annotation tool which allows the user to classify and annotate each pixel of the respective image by respective pigment and/or pigment class specific labels. The image annotation tool is configured to display the respective original digital image together with an exposure adjustment bar, a repertory of available labels (wherein each label is assigned to a specific pigment and/or pigment class), the formula associated with the respective digital image and the respective annotated digital image associated with the original digital image. The image annotation tool comprises an input unit which enables the user to set labels, i.e. to make image annotations. Thus, the human user chooses and sets the labels in alignment with the associated formula.

Alternatively and/or additionally, it is also possible according to a further embodiment of the proposed method, that the provided digital images are pre-treated, respectively. That means that for each formula and for each digital image associated with that formula an image analysis is performed in step 12 in order to identify at least one sparkle point and its location in the respective image. At step 14, the digital images of the respective formulas can be subjected to a pre-analysis in order to detect and to mask out corrupt areas, such as scratches. After such a pre-analysis, at step 16, an image analysis, as described hereinabove, is used to determine the sparkle points of each of the digital images associated with the respective formulas and retrieved from the database. Such image analysis is performed using a computer processor in operative conjunction with at least one image segmentation technique and with at least one classification technique. It is possible to use here a neural network-based technique. In that case, a neural network, herein called second neural network can be used. For this, once the sparkle points have been determined and isolated, at least one sub-image of each sparkle point in the digital images associated with the respective formulas is created, respectively. The created sub-images are provided to the second neural network which is designed as a convolutional neural network (CNN). The second neural network is trained to correlate a respective sub-image of a respective sparkle point with a pigment and/or a pigment class and to identify, based on the respective sub-image of the respective sparkle point, the pigment and/or the pigment class. Thus, each sparkle point in a respective digital image is classified and assigned to a pigment and/or pigment class.

At step 18, for each image of the respective formulas, false classifications are corrected in the image annotation tool by visually reviewing the respective image pixel-wise, using at least one localized segmentation technique. The localized segmentation technique may be moreover a manual segmentation technique. When annotating each pixel of a respective digital image, the visual inspection of the respective digital image is made in alignment with the respective formulation associated with the respective digital image. The respective formulation explicitly indicates respective exact concentrations of included pigments and/or pigment classes and, therefore, respective contributions of the included pigments and/or pigment classes to the paint/color as shown on the digital image and as resulting when the respective formulation is applied as sample coating to a sample substrate. Each pixel is labeled with a specific label. If there is no clearly identifiable pigment or pigment class specific label which can be set in view of the visual inspection and the known formulation associated with the respective digital image, the respective pixel is assigned to a label associated with the background, e.g. the background specific label may be "0". The label associated with the background is subsumed herein under the pigment labels and/or pigment class labels. The image annotation tool displays both to a user, the respective original digital image with exposure adjustment bar and the annotated image which results after the user has made its annotations, by using/setting respective specific labels, and/or has corrected false classifications. Further the image annotation tool displays the labels which can be set by the user and the associated formula from the database. The image annotation tool may have both, automated localized segmentation and manual segmentation capabilities. At step 20, a semantic pixel-wise segmentation convolutional neural network, such as U-net or SegNet, herein called the first neural network, is trained with the digital images from the database as input images and the associated pixel-wise annotated images as output images. In step 22, the trained first neural network, i.e. the trained semantic segmentation convolutional neural network is made available in at least one processor for applying the trained first neural network, i.e. the trained correlation between input image and output pigments and/or pigment classes to at least one unknown input image of a target coating and for assigning a pigment label and/or a pigment class label to each pixel in the unknown input image. Thus, a statistic about pigments and/or pigment classes included in the target coating is generated. The retrieved statistic can be used for color search and/or color retrieval processes. The wording "unknown input image of a target coating" means that a formulation associated with that input image is unknown, i.e. the pigments and/or pigment classes and their respective concentrations which are used to form the target coating underlying the unknown input image, i.e. from which the unknown input image was taken, are unknown.

When searching for a formula best matching the target coating, digital images of the target coating are to be provided. Such digital images can be created using an image capturing device. After obtaining the digital images of the target coating, it may be useful to perform first a pre-analysis of the digital images for identifying defects, such as scratches. Finally, at least one digital image of the target coating is selected as input image for the trained first neural network in order to get a statistic of identified pigments and/or pigment classes as ingredients of the target coating and an associated target formula.

Due to the semantic segmentation each pixel in a respective input image of the target coating is assigned to a pigment and/or pigment class label, i.e. the associated annotated image has an assigned pigment and/or pigment (sparkle) class, e.g. yellow, blue, red, green, neutral, etc, for every pixel in the respective input image in step 24. Each pixel of the background is assigned to the pigment class "background". The respective labels for the respective pigments and/or pigment classes must be predefined but can be defined arbitrarily. The first neural network is trained to classify every pixel in the input image with the associated pigment and/or pigment class of the associated annotated image. Based on the annotated images, for each input image, a statistic of the identified pigments and/or pigment classes can be determined in step 26. Finally, based on such statistic, optionally combined with other informations, a formula for the target coating can be determined. By means of a mixing unit, a coating matching the target coating sufficiently good can be created.

Figure 3:
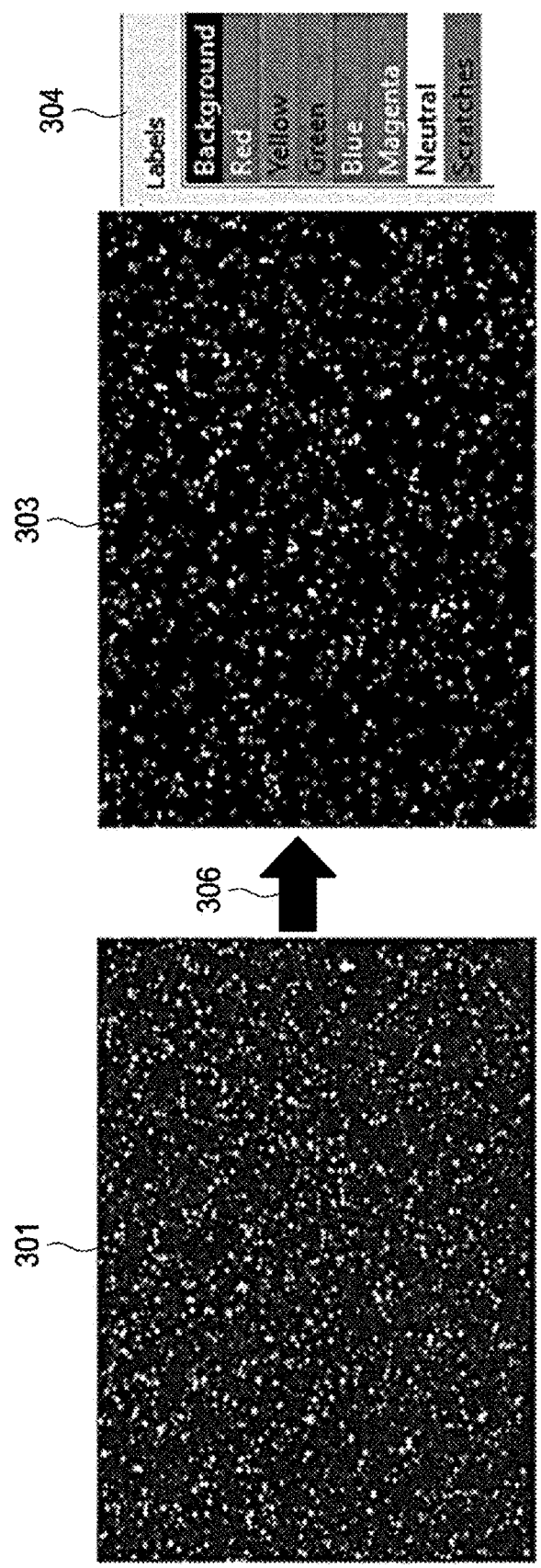
FIG. 3 shows by means of images/pictures the course of an embodiment of the claimed method.
Figure 3:
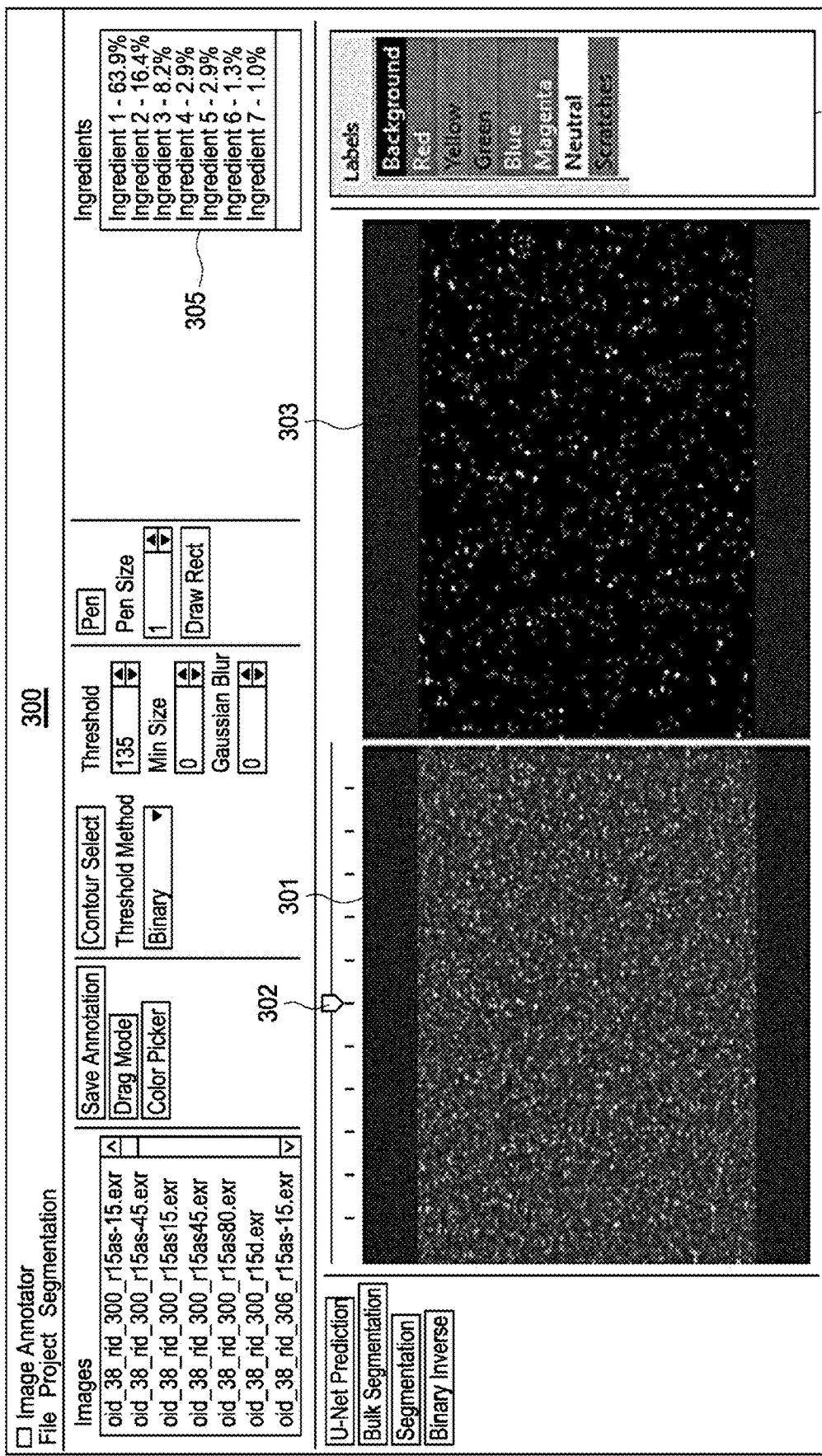
Figure 3:
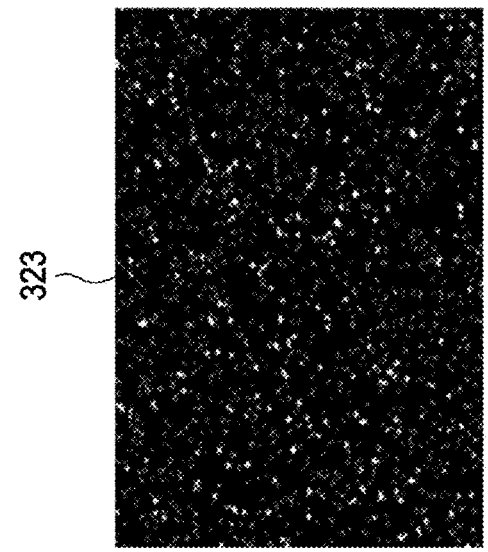
Figure 3:
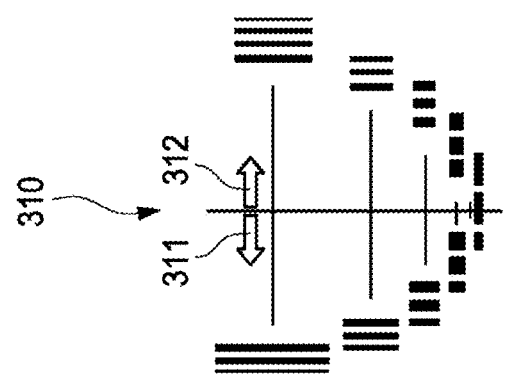
Figure 3:
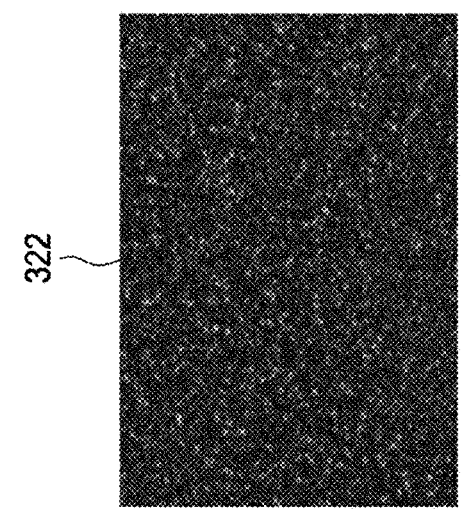

FIG. 3a shows an original HDR (High Dynamic Range) image 301 of a formula from a database which comprises formulas for coating compositions with known pigments and/or pigment classes, and digital images associated with the respective formulas. According to one embodiment of the proposed method, a human user directly visually reviews each digital image 301 for all formulations in the database, using the image annotation tool 300, and makes image annotations for each image 301, i.e. sets labels 304 from a label repertory which is provided by the image annotation tool 300 via a suitable user interface, particularly via a graphical user interface. Thus, an associated image 303 is obtained for each image 301, as indicated by arrow 306. According to a further embodiment of the proposed method, alternatively and/or additionally, at a first step, image segmentation techniques are used to identify sparkle points of known pigments and/or pigment classes for all formulations and associated images in the database. Such database generally comprises more than 30.000 formulas and associated images, i.e. image sets. The image analysis uses image segmentation techniques to identify the locations of the sparkle points in the image (different algorithms may be used to identify the sparkle points and to get information about brightness and location of the different sparkle points).

As shown in FIG. 3b false classifications are visually reviewed and corrected in the image annotation tool 300 using localized and manual segmentation techniques. The image annotation tool 300 shows the original image 301 with exposure adjustment bar 302, the annotated image 303, the labels 304, and the associated formula 305. The image annotation tool 300 has automated localized segmentation and manual segmentation capabilities.

A semantic "pixel-wise" segmentation convolutional neural network (e.g. U-net, SegNet, etc.), herein called first neural network 310, as shown in FIG. 3c, is trained with HDR images 301 from the database as the input, i.e. as input images, and the associated annotated images 303 from FIGS. 3a and 3b as the output, i.e the output images. The trained first neural network 310, i.e. the respective semantic segmentation assigns a pigment and/or pigment class label to each pixel in an image 322. Thus, the associated annotated image 323 has an assigned pigment and/or pigment (sparkle) class (e. g. yellow, blue, red, green, neutral, etc.) for every pixel in the input image 322. The first neural network 310 is trained to classify every pixel in the input image 322 with the associated pigment and/or pigment (sparkle) class of the annotated image 323. In this illustrative example, the U-net 310 consists of contracting path 311 with convolutional and max pooling layers and an expanding path 312 with deconvolutional layers followed by convolutional layers. There are additional connections to transfer features from the contracting path 311 to the expanding path 312.

It is possible to train the first neural network 310 continuously, i.e. during operation, by correcting future false model predictions in the image annotation tool 300 and continue training the first neural network 310, e.g. the U-Net, "on the fly".

The application of the above described pixel-wise convolutional neural network model includes:

1. Calculate effect pigment statistics for a target coating having multiple effect pigments (this shows the likelihood that a given effect pigment is in the paint line.)
2. Use the effect pigment statistics as part of a filter and fitness algorithm for search/retrieval of potential matches to a target coating from a formulations and measurements database.
3. Use the effect pigment statistics as part of a fitness algorithm for adjusting a formula from an original composition and measurement to a target measurement.
4. Use the effect pigment statistics as part of filter and fitness algorithm to develop a composition (match from scratch) to match a target coating.

Figure 4:
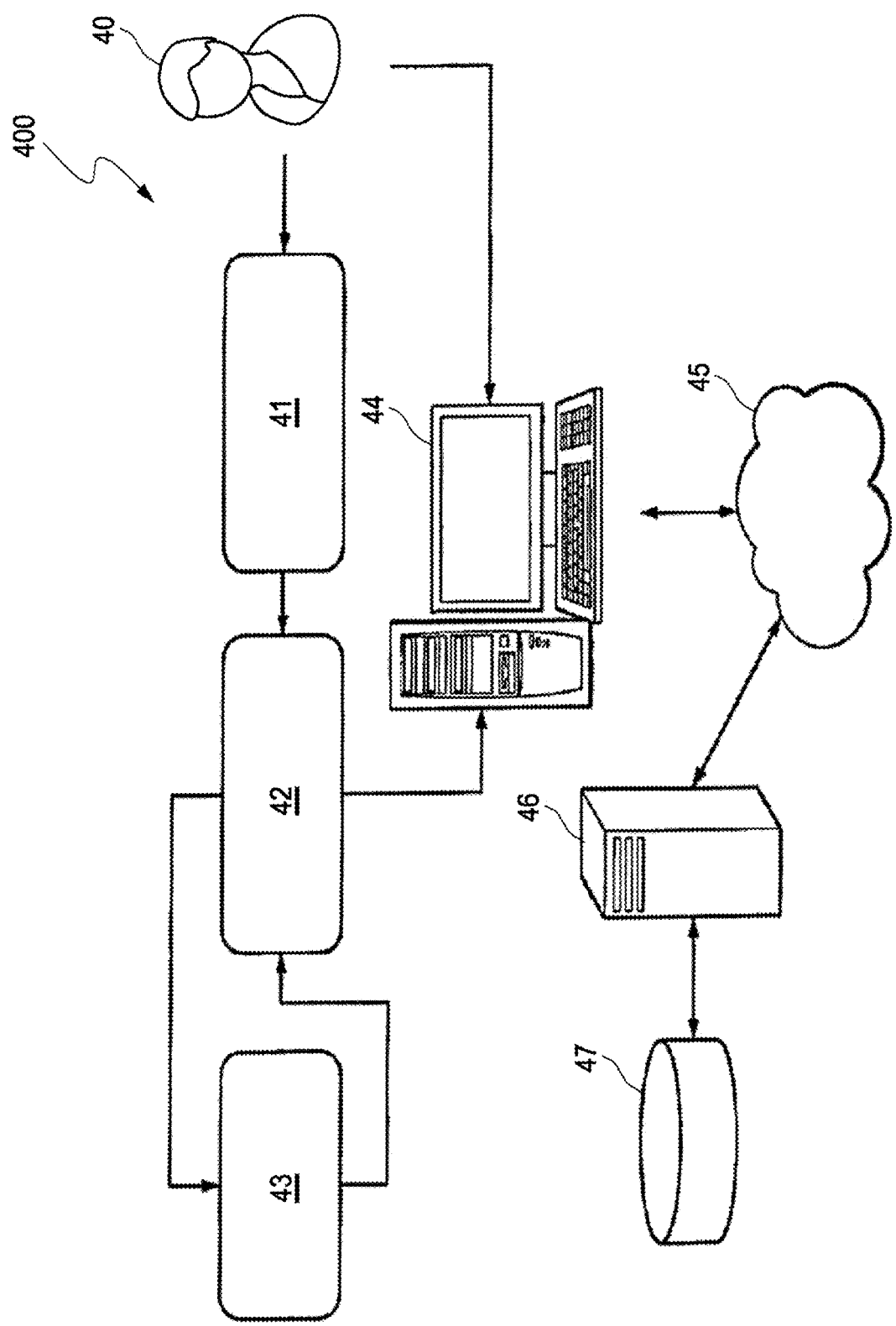
FIG. 4 shows an embodiment of the proposed device.

FIG. 4 illustrates an embodiment of a device 400 which may be used to identify pigments and/or pigment classes of pigments of a coating mixture of a target coating 43. A user 40 may utilize a user interface 41, such as a graphical user interface, to operate at least one measuring device 42 to measure the properties of the target coating 43, i. e. to capture digital images of the target coating by means of a camera, each image being obtained at a different image-based texture measurement geometry, e. g. at a different angle, and, optionally, to determine color values and/or texture values for different spectral measurement geometries, using, for instance, a spectrophotometer. The data from the at least one measuring device, e. g the camera 42 may be transferred to a computer 44, such as a personal computer, a mobile device, or any type of processor. The computer 44 may be in communication, i. e. in a communicative connection, via a network 45, with a server 46. The network 45 may be any type of network, such as the Internet, a local area network, an intranet, or a wireless network. The server 46 is in communication with a database 47 that may store the data and information that are used by the methods of embodiments of the present invention for comparison purposes. In various embodiments, the database 47 may be utilized in, for example, a client server environment or in, for example, a web-based environment such as a cloud computing environment. Various steps of the methods of embodiments of the present invention may be performed by the computer 44 and/or the server 46. In another aspect, the invention may be implemented as a non-transitory computer-readable medium containing software for causing a computer or computer system to perform the method described above. The software can include various modules that are used to enable at least one processor and a user interface to perform the methods described herein.

It can be understood that embodiments of the invention may be used in conjunction with other methods for pigment identification using texture parameters, e. g. hue, intensity, size and/or reflectance data. In various embodiments, in order to properly identify the type of toners, i.e. pigments and/or pigment classes, or an offset thereof, used in an unknown target coating, it is desirable to observe the correct angles and compare back to existing known toners in a database that has been previously created. Binary mixtures of toners may be generated to evaluate the impact of various concentrations of the toners on their sparkle color attribute.

LIST OF REFERENCE SIGNS 101 original image
102 analysed image
103 original image
104 analysed image
105 original image
106 analysed image
10 method step
12 method step
14 method step
16 method step
18 method step
20 method step
22 method step
24 method step
26 method step
300 image annotation tool
301 original image
302 exposure adjustment bar
303 annotated image
304 labels
305 associated formula
306 arrow
310 first neural network
311 contracting path
312 expanding path
322 original image
323 annotated image
400 device
40 user
41 user interface
42 measuring device
43 target coating
44 computer
45 network
46 server
47 database

The invention claimed is:

1. A computer-implemented method, the method comprising at least the following:
   providing digital images and respective formulas for coating compositions with known pigments and/or pigment classes associated with the respective digital images,
   configuring an image annotation tool for classifying, for each digital image, each pixel by visually reviewing the respective digital image pixel-wise using at least one image segmentation technique and annotating each pixel with a pigment label and/or a pigment class label in alignment with a visual appearance and the formula associated with the respective digital image;
   providing, for each digital image, an associated pixel-wise annotated image;
   training a first neural network, implemented and running on at least one computer processor, with the provided digital images as input and the associated pixel-wise annotated images as output, wherein the first neural network is trained to correlate every pixel in a respective input image with a pigment label and/or a pigment class label of a respective associated annotated image;
   making the trained first neural network available in the at least one computer processor for applying the trained first neural network to at least one unknown input image of a target coating and for assigning a pigment label and/or a pigment class label to each pixel in the at least one unknown input image, wherein the pigment labels and/or the pigment class labels include both pigment or pigment class specific labels and background specific labels; and
   determining and/or outputting, for each unknown input image, based on the assigned pigment labels and/or pigment class labels, a statistic of corresponding identified pigments and/or pigment classes, respectively.

2. The method according to claim 1, wherein the at least one image segmentation technique is selected from the group consisting of: neural-network based methods, threshold methods, edge-based methods, clustering methods, histogram-based methods, hybrid methods, and combinations thereof.

3. The method according to claim 1, wherein providing the digital images and the pixel-wise classification of the digital images comprise:
   providing a database which comprises the formulas for the coating compositions with known pigments and/or pigment classes, and the digital images associated with the respective formulas,
   performing, using the at least one computer processor in operative conjunction with at least one of the at least one image segmentation technique, for each formula and for each digital image associated with that formula, an image analysis to identify at least one sparkle point and a location of the at least one sparkle point within the respective digital image,
   classifying, using the at least one computer processor in operative conjunction with at least one image classification technique, for each digital image, each identified sparkle point, and
   correcting false classifications within each digital image in the image annotation tool by visually reviewing the respective digital image pixel-wise, using at least one localized segmentation technique of the at least one image segmentation technique.

4. The method according to claim 3, wherein classifying the identified sparkle points is performed using a second neural network and comprises at least the following:
   creating sub-images of each identified sparkle point from the respective digital images;
   providing the sub-images as respective input to the second neural network, the second neural network trained to correlate a respective sub-image of a respective sparkle point with a pigment and/or pigment class;
   obtaining from the second neural network, for each identified sparkle point associated with the respective sub-image, the correlated pigment and/or pigment class as a respective output; and
   classifying, for each digital image, each identified sparkle point based on the respective output of the second neural network.

5. The method according to claim 1, further comprising:
   using the statistic of the identified pigments and/or pigment classes as additional information within a database search for the target coating by comparing the statistic of the identified pigments and/or pigment classes with respective statistics determined for one or more preliminary matching formulas; and
   determining at least one of the one or more preliminary matching formulas as formula(s) best matching with the target coating.

6. The method according to claim 1 further comprising using the statistic of the identified pigments and/or pigment classes as part of a filter and fitness algorithm to develop a composition to match the target coating.

7. The method according to claim 1, wherein the pixel-wise classification of the digital images is performed and/or supplemented by visual inspection and manual entering of respective annotations in the image annotation tool.

8. The method according to claim 1, wherein the first neural network is chosen as a pixel-wise segmentation convolutional neural network.

9. The method according to claim 1, wherein the first neural network is based on and/or is realized as at least one of the following neural networks: U-net and SegNet.

10. A device comprising:
   a database comprising formulas for coating compositions with known pigments and/or pigment classes, and digital images associated with the respective formulas; and
   at least one computer processor in communicative connection with the database, at least one image segmentation technique, an image annotation tool and at least one neural network, and programmed to execute at least the following:
   a) retrieving, from the database, the digital images and the respective formulas for coating compositions with known pigments and/or pigment classes associated with the respective digital images,
   b) configuring the image annotation tool for classifying, for each digital image, each pixel, by visually reviewing the respective digital image pixel-wise, using the at least one image segmentation technique, and annotating each pixel with a pigment label and/or a pigment class label in alignment with a visual appearance and the formula associated with the respective digital image,
   c) providing, for each digital image, an associated annotated image,
   d) training a first neural network with the digital images from the database as input and the associated annotated images as output, wherein the first neural network is trained to correlate every pixel in a respective input image with a pigment label and/or a pigment class label of a respective associated annotated image, e) making the trained first neural network available for applying the trained first neural network to at least one unknown input image of a target coating and for assigning a pigment label and/or a pigment class label to each pixel in the at least one unknown input image, wherein the pigment labels and/or the pigment class labels include both pigment or pigment class specific labels and background specific labels, and f) determining and/or outputting, for each unknown input image, based on the assigned pigment labels and/or pigment class labels, a statistic of corresponding identified pigments and/or pigment classes, respectively.

11. The device according to claim 10, wherein the at least one image segmentation technique is selected from the group consisting of: manual image segmentation methods, neural-network based methods, threshold methods, edge-based methods, clustering methods, histogram-based methods, hybrid methods, and combinations thereof.

12. The device according to claim 10, wherein the first neural network is a pixel-wise segmentation convolutional neural network.

13. The device according to claim 10, further comprising an output unit which is configured to output, for each unknown input image, the statistic of the corresponding identified pigments and/or pigment classes, respectively, supplemented by an annotated image associated with the respective unknown input image.

14. The device according to claim 10, wherein the image annotation tool is configured to display the digital image with an exposure adjustment bar, the associated annotated image, and available labels that can be selected to annotate the digital image in order to form the associated annotated image.

15. The device according to claim 10, wherein the device is configured to execute a method, the method comprising:

providing digital images and respective formulas for coating compositions with known pigments and/or pigment classes associated with the respective digital images, configuring an image annotation tool for classifying, for each digital image, each pixel by visually reviewing the respective digital image pixel-wise using at least one image segmentation technique and annotating each pixel with a pigment label and/or a pigment class label in alignment with a visual appearance and the formula associated with the respective digital image, providing, for each digital image, an associated pixel-wise annotated image, training a first neural network, implemented and running on at least one computer processor, with the provided digital images as input and the associated pixel-wise annotated images as output, wherein the first neural network is trained to correlate every pixel in a respective input image with a pigment label and/or a pigment class label of a respective associated annotated image, making the trained first neural network available in the at least one computer processor for applying the trained first neural network to at least one unknown input image of a target coating and for assigning a pigment label and/or a pigment class label to each pixel in the at least one unknown input image, wherein the pigment labels and/or the pigment class labels include both pigment or pigment class specific labels and background specific labels, and determining and/or outputting, for each unknown input image, based on the assigned pigment labels and/or pigment class labels, a statistic of corresponding identified pigments and/or pigment classes, respectively.

16. The device according to claim 10, wherein the first neural network is based on and/or is realized as at least one of the following neural networks: U-net and SegNet.

17. A non-transitory computer readable medium with a computer program including program codes that are configured and programmed, when the computer program is loaded and executed by at least one computer processor which is in communicative connection with at least one image segmentation technique, an image annotation tool, at least one neural network, and a database which comprises formulas for coating compositions with known pigments and/or pigment classes and digital images associated with the respective formulas, to execute at least the following:

A) retrieving, from the database, digital images and respective formulas for coating compositions with known pigments and/or pigment classes associated with the respective digital images, B) configuring the image annotation tool for classifying, for each digital image, each pixel, by visually reviewing the respective digital image pixel-wise using the at least one image segmentation technique, and annotating each pixel with a pigment label and/or a pigment class label in alignment with a visual appearance and the formula associated with the respective digital image, C) providing, for each digital image, an associated annotated image, D) training a first neural network with the digital images from the database as input and the associated annotated images as output, wherein the first neural network is trained to correlate every pixel in a respective input image with a pigment label and/or a pigment class label of a respective associated annotated image, E) making the trained first neural network available for applying the trained first neural network to an unknown input image of a target coating and for assigning a pigment label and/or a pigment class label to each pixel in the unknown input image, wherein the pigment labels and/or the pigment class labels include both pigment or pigment class specific labels and background specific labels, and F) determining and/or outputting, for each unknown input image, based on the assigned pigment labels and/or pigment class labels, a statistic of corresponding identified pigments and/or pigment classes, respectively.

* * * * *